(12) United States Patent
Chorvath et al.

(10) Patent No.: US 8,907,037 B2
(45) Date of Patent: Dec. 9, 2014

(54) PREPARATION OF LIGNOCELLULOSIC PRODUCTS

(75) Inventors: Igor Chorvath, Midland, MI (US); Xiaobing Zhou, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 13/637,603

(22) PCT Filed: Mar. 25, 2011

(86) PCT No.: PCT/US2011/030042
§ 371 (c)(1),
(2), (4) Date: Sep. 26, 2012

(87) PCT Pub. No.: WO2011/119990
PCT Pub. Date: Sep. 29, 2011

(65) Prior Publication Data
US 2013/0022807 A1   Jan. 24, 2013

Related U.S. Application Data

(60) Provisional application No. 61/317,874, filed on Mar. 26, 2010.

(51) Int. Cl.
| | |
|---|---|
| *C08G 77/24* | (2006.01) |
| *C08G 18/76* | (2006.01) |
| *C08G 18/64* | (2006.01) |
| *C08L 91/06* | (2006.01) |
| *C08G 18/61* | (2006.01) |
| *C08G 18/30* | (2006.01) |
| *C08L 97/02* | (2006.01) |
| *C08L 61/24* | (2006.01) |
| *C08L 61/28* | (2006.01) |
| *C08L 61/06* | (2006.01) |
| *C08L 61/12* | (2006.01) |

(52) U.S. Cl.
CPC ............. *C08G 18/7664* (2013.01); *C08L 61/24* (2013.01); *C08G 18/6492* (2013.01); *C08L 61/28* (2013.01); *C08L 61/06* (2013.01); *C08L 91/06* (2013.01); *C08G 18/61* (2013.01); *C08G 18/302* (2013.01); *C08L 97/02* (2013.01); *C08L 61/12* (2013.01)
USPC .......................................................... 528/28

(58) Field of Classification Search
USPC .......................................................... 528/28
See application file for complete search history.

(56) References Cited

U.S. PATENT DOCUMENTS

| | | | | |
|---|---|---|---|---|
| 4,740,575 | A * | 4/1988 | Nguyen et al. ............. | 528/26.5 |
| 8,450,384 | B2 | 5/2013 | Cremer | |
| 2005/0131088 | A1 * | 6/2005 | Stanjek et al. ............. | 521/50 |
| 2008/0051482 | A1 | 2/2008 | Stanjek et al. | |
| 2010/0127219 | A1 * | 5/2010 | Mohamed ................. | 252/500 |
| 2010/0267854 | A1 * | 10/2010 | Cremer et al. ............. | 521/154 |
| 2011/0034574 | A1 * | 2/2011 | Cremer ....................... | 521/130 |
| 2011/0201712 | A1 * | 8/2011 | Cremer ....................... | 521/137 |

FOREIGN PATENT DOCUMENTS

| | | |
|---|---|---|
| EP | 0190368 A2 | 8/1986 |
| EP | 0230666 A2 | 8/1987 |
| EP | 0679670 A1 | 11/1995 |
| GB | 2370577 A | 3/2002 |
| JP | 05-079570 A | 3/1993 |
| JP | 08-333433 A | 12/1996 |
| JP | 2004-142155 A | 5/2004 |
| JP | 2005-520035 A | 7/2005 |
| JP | 2009-234150 A | 10/2009 |
| WO | WO 2008088733 A2 | 7/2008 |
| WO | WO 2009/130194 A1 | 10/2009 |
| WO | WO 201069821 A1 | 6/2010 |

OTHER PUBLICATIONS

English language abstract and machine-assisted English translation for JP 2004-142155 extracted from the PAJ database on Jan. 24, 2013, 28 pages.
Rowell, R.M.; Banks, W.B., "Water Repellency and Dimensional Stability of Wood", General Technical Report FPL-50, U.S. Department of Agriculture, Forest Services, Forest Products Laboratory; 1985; Madison, WI USA, 28 pages.
International Search Report for application No. PCT/US2011/030042 dated Jun. 1, 2011, 3 pages.
English language abstract and machine-assisted English translation for JP 05-079570 extracted from the PAJ database on Apr. 28, 2014, 26 pages.
English language abstract and machine-assisted English translation for JP 08-333433 extracted from the PAJ database on Apr. 28, 2014, 24 pages.
English language abstract not found for JP 2005-520035; however, see English language equivalent U.S. 2008/0051482. Original document extracted from espacenet.com database on Apr. 28, 2014, 17 pages.
English language abstract and machine-assisted English translation for JP 2009-234150 extracted from the PAJ database on Apr. 28, 2014, 39 pages.
English language abstract for WO 2009/130194 extracted from the espacenet.com on Apr. 28, 2014, 41 pages.
English language abstract for WO 2010/069821 extracted from the espacenet.com on Apr. 28, 2014, 35 pages.

\* cited by examiner

*Primary Examiner* — Margaret Moore
(74) *Attorney, Agent, or Firm* — Howard & Howard Attorneys PLLC

(57) ABSTRACT

A method of preparing a polymeric methylene diphenyl diisocyanate-polydialkylsiloxane resin by mixing at a temperature between 25° C. and 100° C.: (i) a polymeric methylene diphenyl diisocyanate with (ii) a polydialkylsiloxane selected from hydroxyalkyl dialkyl terminated polydialkylsiloxane having a viscosity of from 5 to 500 000 cSt at 25° C. or (hydroxyalkoxy)alkyl dialkyl terminated polydialkylsiloxane having a viscosity of from 5 to 500 000 cSt at 25° C. in an amount such that from 1 to 99% by weight of the total weight of (i) and (ii) is component (ii), optionally in the presence of a solvent; and subsequently extracting the solvent, if present.

15 Claims, No Drawings

PREPARATION OF LIGNOCELLULOSIC PRODUCTS

RELATED APPLICATIONS

This application is the National Stage of International Patent Application No. PCT/US2011/030042, filed on Mar. 25, 2011, which claims priority to and all the advantages of U.S. Provisional Patent Application No. 61/317,874, filed on Mar. 26, 2010.

The present invention generally relates to lignocellulosic products comprising a plurality of lignocellulosic pieces and a binding agent, lignocellulosic composites articles formed therefrom and to methods of forming the lignocellulosic products and/or lignocellulosic composite articles.

Lignocellulosic composite articles, such as oriented strand board (OSB), oriented strand lumber (OSL), particleboard (PB), scrimber, agrifiber board, chipboard, flakeboard, and fiberboard, e.g., medium density fiberboard (MDF), are generally produced by blending or spraying lignocellulosic pieces with a binding agent, while the lignocellulosic pieces are mixed in a suitable mixer or similar apparatus. After initial mixing a binding agent/lignocellulosic pieces mixture is prepared wherein the lignocellulosic pieces are typically coated with the binding agent. This resulting mixture is subsequently formed into a product which might be suitably described as loosely bonded platter. This loosely bonded board is then compressed, at temperatures of from about 100° C. to about 250° C. optionally in the presence of steam (which may be introduced as part of the process or produced from moisture extracted from the lignocellulosic pieces in the loosely bonded platter). The compression step is utilised to set the binding agent and bond the lignocellulosic pieces together in a densified form, i.e., in the form of a board or panel or the like.

The lignocellulosic pieces used in the above process may be in the form of chips, shavings, strands, scrim, wafers, fibres, sawdust, bagasse, straw and wood wool. The lignocellulosic composite articles produced by the process are known in the art under the general term of "engineered wood" in the cases when the lignocellulosic pieces contained therein are relatively larger in size, e.g., from 2 to 20 cm. Engineered woods are manufactured under a variety of names including, for the sake of example, wafer board, laminated strand lumber, OSB, OSL, scrimber, parallel strand lumber, and laminated veneer lumber.

Smaller lignocellulosic pieces such as, for example, sawdust and the like are used in the preparation of, e.g., particleboard and different types of fibreboard such as MDF and scrimber are thin, long, irregular pieces of wood having average diameters ranging from about 2 to 10 mm and lengths several feet in length.

The engineered woods were developed because of the increasing scarcity of suitably sized tree trunks for cutting lumber. Such engineered woods can have advantageous physical properties such as strength and stability. Another advantage of the engineered woods is that they can be made from the waste material generated by processing other wood and lignocellulosic materials. This leads to efficiencies and energy savings from the recycling process, and saves landfill space.

The binding agent can comprise a variety of alternatives including, for the sake of example, phenol formaldehyde (PF) resins, urea formaldehyde (UF) resins, melamine-formaldehyde resins, resorcinol-formaldehyde resins, isocyanate/urethane resins, poly(vinyl acetate) (PVA), polymeric methylene diphenyl diisocyanates (pMDI) and the like.

Isocyanate based binding agents are commercially desirable because they have low water absorption, high adhesive and cohesive strength, flexibility in formulation, versatility with respect to cure temperature and rate, excellent structural properties, the ability to bond with lignocellulosic materials having high water contents, and importantly, zero formaldehyde emissions. Polymeric methylene diphenyl diisocyanate (i.e. polymeric MDI or pMDI) is widely used to treat lignocellulosic materials with the intention of improving the strength of the resulting composite article.

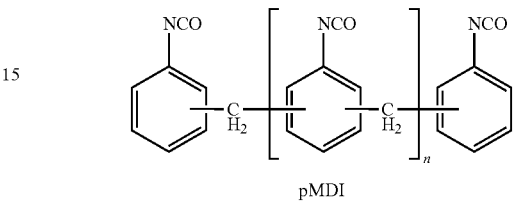

pMDI

Typically, such treatment involves applying the isocyanate to the lignocellulosic material and allowing the isocyanate to cure by, for example, the application of heat and pressure or at room temperature. While it is possible to allow the pMDI to cure under ambient conditions, residual isocyanate (NCO) groups remain on the treated articles for weeks or even months in some instances. It is also known, but generally less acceptable from an environmental standpoint, to utilize toluene diisocyanate (TDI), for such purposes.

Polymeric methylene diphenyl diisocyanate (pMDI) has been used as a structural adhesive in the manufacture of wood-based composites including Oriented Strand Boards (OSB). Compared to other wood structural adhesives such as phenol-formaldehyde (PF) resin, pMDI resin has a lower polarity and viscosity, and cures sufficiently at a lower temperature even in the presence of a high level of water. These superior properties allow pMDI resin to rapidly penetrate into porous wood structures and form a strong bondline during hotpress. However, the composites made of only the resin at a cost effective loading level lack sufficient water repellency and dimensional stability when they are exposed to liquid water. To improve the water repellency and dimensional stability, wax is added as a hydrophobic ingredient along with the resin in the manufacture of the composites. For instance, OSB with good water repellency and dimensional stability are made when wood chips are treated with 3 wt % of pMDI and 1.5 wt % of wax.

One significant problem with these products is that due to their porous structure these engineered wood materials are subject to high water absorption leading to unacceptable swelling. When exposed to moisture or liquid water, boards will swell causing aesthetic and structural problems seen as, e.g., increased thickness at edges, surface roughness of the boards and strongly reduced mechanical strengths, etc.

Typically waxes are added to the lignocellulosic composite articles to provide water repellency and to reduce swelling of lignocellulosic composite articles when exposed to liquid water and/or water vapour. A wide variety of waxes are used. Examples include refined or un-refined paraffin waxes (which can be melts or emulsified suspensions). Un-refined paraffin waxes (often referred to as slack waxes) are used for OSB and MDF production due to their relatively low cost. They are typically an unrefined mixture of high-melting hydrocarbons, mainly of normal straight-chain type containing a fairly high percentage of oil and are generally obtained by filtration from high boiling distillates or residual oils. The selected wax is added to the lignocellulosic composite article during manufacture and is utilised to cover hydrophilic surface present in the lignocellulosic composite article, thereby providing the articles with a degree of water repellency and reduction of swelling of the lignocellulosic composite article via retarding uptake of water. However, especially during prolonged exposure to water boards containing wax show unacceptable levels of water absorption, leading to aesthetical or structural problems in the application.

Another problem regarding these waxes is that their quality may be unacceptably variable as the composition varies due to the variability of the feedstock used for their production. An additional concern for users of such waxes is availability because modern refineries produce significantly less waxes than historically was the case due at least in part to the improvement in catalysts, etc.

Furthermore, the waxes generally selected for this purpose are essentially inert to the other components employed in the lignocellulosic composite article and as such do not react with the other components employed in the lignocellulosic composite article. This means that the selected waxes do not enhance for example, the internal bond (IB) strength of the lignocellulosic composite article, and in some instances may in fact reduce such strength. Similarly, wax does not assist in keeping the lignocellulosic composite article together prior to applying pressure and heat, i.e., while in the loosely bonded platter form, product, a mass, or a "furnish" form, as understood in the art. Furthermore, the need for, high temperatures encountered during manufacture, of the lignocellulosic composite article such as those described above, e.g., during pressing or during steam injection, may lead to sublimation and/or evaporation of the wax from the lignocellulosic composite article. This loss of wax from the lignocellulosic composite article can cause many problems. For example, the build-up of wax can pose a potential fire hazard, with wax building-up and depositing on equipment surfaces. Wax derived vapours can also contribute to the generation of a hydrocarbon haze in a manufacturing facility. In addition, manufacturing costs increase, not only from the physical loss of the wax from the lignocellulosic composite article, e.g., upwards of 50% by weight, but also from clean-up, safety, and housekeeping costs of maintaining a manufacturing apparatus and surrounding area used for making the lignocellulosic composite articles.

Polydimethylsiloxane (PDMS) is known for its superior hydrophobicity and has been used as a post-treatment dip to improve the hydrophobicity of wood products. JP2004142155A also disclosed the use of PDMS to improve mold releasability after hotpressing wood composites. However, this material has not been utilized in the manufacture of OSB as an add-in hydrophobe to improve water repellency and dimensional stability of OSB. Compared to wax, PDMS has a desired higher hydrophobicity and wetting capability, but an undesired higher water permeability. The high water permeability of PDMS may cause problematic water repellency for PDMS-treated OSB. Although the water permeability of PDMS can be reduced by increasing PDMS crosslinking degree or incorporating alkyl groups into PDMS, these modifications are usually detrimental to the hydrophobicity and wetting capability of PDMS. To leverage the desired properties and to improve the undesired property of PDMS for the OSB application, it is believed that a pMDI and PDMS hybrid resin should be used where PDMS is tethered to pMDI through stable covalent chemical bonds.

EP230666A2 describes a method to make a polyurethane prepolymer from pMDI, a silicone polycarbinol and a polyol, and the use of the prepolymer to make a copolymer network. EP679670A1 claimed the composition comprising an organic aromatic isocyanate and a carbinol polysiloxane functionalized with secondary hydroxyl groups, and the use of the composition in thermoformable laminates. WO2008088733A2 describes a broad range of isocyanate silicone copolymers including pMDI-PDMS hybrid resins. Isocyanate prepolymers are among the preferred isocyanate materials that have been used in binder compositions to solve various processing problems, particularly, in reducing adhesion to press platens and for reducing reactivity of the isocyanates.

A pMDI-PDMS hybrid resin suitable for use in the current lignocellulosic pieces e.g. OSB manufacture processes to make e.g. lignocellulosic composite articles should have these basic characteristics:

1) being sprayable, so that the hybrid resin can be uniformly coated on wood particles e.g. chips at less than 5 wt % loading. The viscosity of the hybrid resin is preferred to be around 1000 cSt or less at 25° C., or similar to that of pMDI resin.
2) being curable during hotpress, so that PDMS can be immobilized on each wood chips in finished boards. The hybrid resins should contain sufficient isocyanate groups for crosslinking.
3) being stable. The hybrid resin should not undergo compositional or rheological change in order to maintain a consistent performance within a reasonable timeframe.
4) being cost effective, compared to the benchmark pMDI and wax combination.

None of the pMDI-PDMS hybrid resins reported in the literature meets all of these criteria. The polyurethane prepolymers disclosed in EP230666A2 and EP679670A1 are not suitable for spraying due to high viscosity. The isocyanate silicone copolymers described in WO2008088733A2 are made from aliphatic isocyanates that do not have the desired cure rate. To synthesize such a pMDI-PDMS hybrid resin, silanol, amino or carbinol functional PDMS have been evaluated. Most products had the problems of gel formation, phase separation or high viscosity (difficult spray).

In accordance with the present invention there is provided a method of preparing a polymeric methylene diphenyl diisocyanate-polydialkylsiloxane resin by mixing at a temperature between 25° C. and 100° C.:

(i) polymeric methylene diphenyl diisocyanate with
(ii) a polydialkylsiloxane selected from hydroxyalkyl dialkyl terminated polydialkylsiloxane having a viscosity of from 5 to 500 000 cSt at 25° C. or (hydroxyalkoxy) alkyl dialkyl terminated polydialkylsiloxane having a viscosity of from 5 to 500 000 cSt at 25° C. in an amount such that from 1 to 99% by weight of the total weight of (i) and (ii) is component (ii), optionally in the presence of a solvent; and subsequently extracting the solvent, if present.

All viscosity measurement are taken using a calibrated Cannon viscometer at 25° C. (unless otherwise indicated).

Also in accordance with the present invention there is provided a polymeric methylene diphenyl diisocyanate-polydialkylsiloxane resin obtainable by mixing at a temperature between 25° C. and 100° C.:

(i) polymeric methylene diphenyl diisocyanate with
(ii) a polydialkylsiloxane selected from hydroxyalkyl dialkyl terminated polydialkylsiloxane having a viscosity of from 5 to 500 000 cSt at 25° C. or (hydroxyalkoxy) alkyl dialkyl terminated polydialkylsiloxane having a viscosity of from 5 to 500 000 cSt at 25° C. in an amount such that from 1 to 99%, alternatively from 20 to 60% by weight of the total weight of (i) and (ii) is component (ii), optionally in the presence of a solvent; and subsequently extracting the solvent, if present.

In accordance with the present invention there is provided a reaction product of:
(i) polymeric methylene diphenyl diisocyanate and
(ii) a polydialkylsiloxane selected from hydroxyalkyl dialkyl terminated polydialkylsiloxane having a viscosity of from 5 to 500 000 cSt at 25° C. or (hydroxyalkoxy) alkyl dialkyl terminated polydialkylsiloxane having a viscosity of from 5 to 500 000 cSt at 25° C. wherein reaction mixture contained from 1 to 99%, alternatively from 20 to 60 weight % of by weight of the total weight of (i) and (ii) is component (ii).

The polymeric methylene diphenyl diisocyanate (i) preferably has the general structure

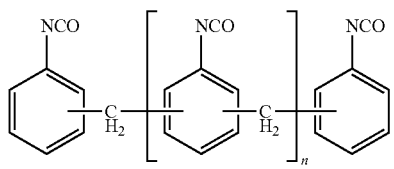

where the average value of n is from 0 to 10.

As previously mentioned whilst from 1 to 99%, alternatively from 20 to 60 weight % by weight of the total weight of (i) and (ii) is component (ii), it is preferred that the polymeric methylene diphenyl diisocyanate (i) is present in an amount of from 40 to 80 weight %, preferably in excess, i.e., is present in an amount of greater than 50% of the total weight of (i) and (ii), i.e. most preferably in a range of from 50 to 80%.

The polydialkylsiloxane (ii) is selected from hydroxyalkyl dialkyl terminated polydialkylsiloxane having a viscosity of from 5 to 500 000 cSt at 25° C. or (hydroxyalkoxy)alkyl dialkyl terminated polydialkylsiloxane having a viscosity of from 5 to 500 000 cSt at 25° C.

The hydroxyalkyl dialkyl terminated polydialkylsiloxane may comprise any suitable hydroxyalkyl group for example, 2-hydroxyethyl, 3-hydroxypropyl or 4-hydroxybutyl groups. The hydroxyalkyl dialkyl terminated polydialkylsiloxane has a viscosity of from 5 to 500 000 cSt at 25° C., alternatively a viscosity of from 5 to 10 000 cSt at 25° C., alternatively a viscosity of from 5 to 1500 cSt at 25° C. One hydroxyalkyl dialkyl terminated polydialkylsiloxane is a 3-hydroxypropyl dialkyl terminated polydialkylsiloxane having a viscosity of from 5 to 500 000 cSt at 25° C. alternatively a viscosity of from 5 to 10 000 cSt at 25° C., alternatively a viscosity of from 5 to 1500 cSt at 25° C. Each alkyl group in the hydroxyalkyl dialkyl terminated polydialkylsiloxane may be the same or different but contains between 1 and 8 carbon atoms and may be linear or branched such as methyl, ethyl, propyl, isopropyl, butyl, isobutyl, pentyl, hexyl, heptyl, or octyl group. Typically the vast majority of alkyl groups and preferably all alkyl groups are methyl groups and as such the 3-hydroxypropyl dialkyl terminated polydialkylsiloxanes may have general formula:

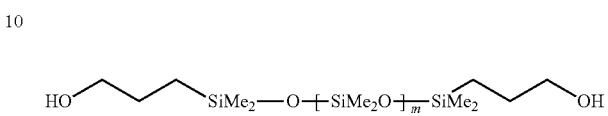

where m is a number such that the viscosity is within the range specified above. Preferably the value of m is between 0 and 500, alternatively the value of m is between 0 and 50, alternatively the value of m is between 1 and 25, alternatively the value of m is between 5 and 15.

The end-product of the reaction between (i) and a hydroxyalkyl dialkyl terminated polydialkylsiloxane such as a 3-hydroxypropyl dialkyl terminated polydimethylsiloxane is a resin and as such is a very complex structure but it is believed that the general polymeric structure will involve the following

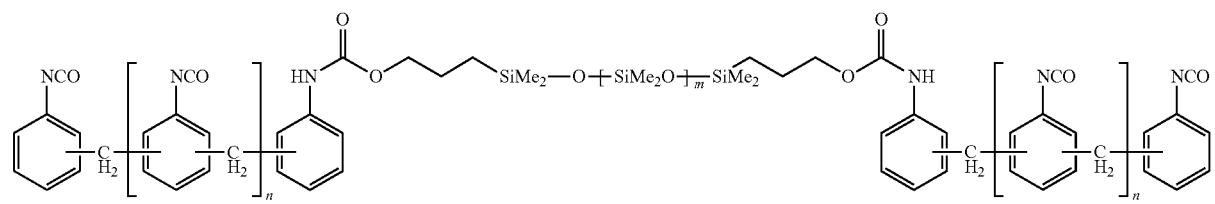

where n and m as hereinbefore described.

The (hydroxyalkoxy)alkyl dialkyl terminated polydialkylsiloxane having a viscosity of from 5 to 500 000 cSt at 25° C. may comprise any suitable (hydroxyalkoxy)alkyl group(s) for example may be selected from 2-(hydroxyethoxy)alkyl, (3-hydroxypropoxy)alkyl, (2-hydroxyisopropoxy)alkyl, (4-hydroxybutoxy)alkyl, (5-hydroxypentoxy) and (6-hydroxyhexoxy)alkyl. The (hydroxyalkoxy)alkyl dialkyl terminated polydialkylsiloxane has a viscosity of from 5 to 500 000 cSt at 25° C. alternatively a viscosity of from 5 to 10 000 cSt at 25° C., alternatively a viscosity of from 5 to 1500 cSt at 25° C. A preferred example is 3-(2-hydroxyethoxy)propyl dialkyl terminated polydialkylsiloxane has a viscosity of from 5 to 500 000 cSt at 25° C. alternatively a viscosity of from 5 to 10 000 cSt at 25° C., alternatively a viscosity of from 5 to 1500 cSt at 25° C. Each alkyl group in the (hydroxyalkoxy)alkyl dialkyl terminated polydialkylsiloxane contains between 1 and 8 carbon atoms and may be linear or branched such as methyl, ethyl, propyl, isopropyl, butyl, isobutyl, pentyl, hexyl, heptyl, or octyl group. Typically the vast majority of alkyl groups and preferably all alkyl groups are methyl groups and as such the 3-(2-hydroxyethoxy)propyl dialkyl terminated polydialkylsiloxane may have general formula:

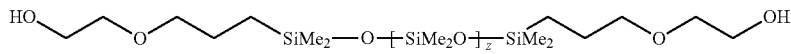

where z is a number such that the viscosity is within the range specified above. Preferably the value of z is between 0 and 500, alternatively the value of z is between 0 and 50, alternatively the value of z is between 1 and 25, alternatively the value of z is between 5 and 15.

The end-product of the reaction between (i) and a (hydroxyalkoxy)alkyl dialkyl terminated polydialkylsiloxane, such as a 3-(2-hydroxyethoxy)propyl dialkyl terminated polydialkylsiloxane, is a resin and as such is a very complex structure but it is believed that an analogous general polymeric structure to that in paragraph where n and z are as hereinbefore described Any suitable solvent may be utilised. Preferably the solvent is one in which both components of the reaction are miscible. Examples include, e.g., benzene, toluene, xylenes, tetrahydrofuran (THF) and acetone.

Preferably the method of preparation of the polymeric methylene diphenyl diisocyanate-polydialkylsiloxane resin takes place at a temperature above room temperature (i.e. from 25° C. to 100° C.), for example at a temperature between 50 and 100° C., alternatively a temperature between 60 and 80° C. Any suitable process may be utilised. In one preferred method component (i) is mixed with solvent, e.g., toluene and heated to a temperature of between 50 and 100° C., a solution of component (ii) in the same solvent is then introduced and the reaction mixture is agitated (e.g., stirred) for a predetermined period of time, e.g., 5 minutes to 2 hours, alternatively between 15 minutes and 1.5 hours, before removing the solvent and recovering the reaction product. Typically it has been found that the polymeric methylene diphenyl diisocyanate-polydialkylsiloxane resin as hereinbefore described and prepared was a homogeneous and stable product which was of viscosity suitable for use in a spraying operation such as in the case of coating lignocellulosic pieces to form composite products as will be discussed hereafter, e.g. a viscosity of from 5 to 10 000 cSt at 25° C., alternatively a viscosity of from 5 to 1500 cSt at 25° C. However, it has also been identified that the resin may be prepared by introducing and blending pMDI with a more viscous organopolysiloxane i.e. an organopolysiloxane with a viscosity of up to 500000 cSt at 25° C.

The solvent may be removed via any suitable method but preferably is removed from the reaction mixture upon completion via vacuum stripping.

The pMDI-PDMS hybrid resin prepared in accordance with the present invention preferably has the following properties:

1) sprayable, so that the hybrid resin can be uniformly coated on wood chips at less than 5 wt % loading. The viscosity of the hybrid resin is between 5 and 10 000 cSt at 25° C., alternatively between 5 and 2000 cSt at 25° C. alternatively between 5 and 1500 cSt at 25° C., alternatively between 200 and 1500 cSt at 25° C.
2) curable during hotpress process, so that PDMS can be immobilized on each lignocellulosic piece in finished boards, the hybrid resin contains sufficient isocyanate groups for crosslinking.
3) stable. The hybrid resin does not appear to undergo compositional or rheological change and hence has the ability to maintain a consistent performance for at least 3 months and is
4) cost effective, compared to the benchmark pMDI and wax combination.

The resulting product may be used for a variety of applications including, for example, rigid or flexible foams, adhesives, sealants, microcellular products, cast elastomers, thermoplastic elastomers, surface coatings and fibres. However, use as an additive for rendering lignocellulosic composite articles, such as oriented strand board (OSB), oriented strand lumber (OSL), particleboard (PB), scrimber, agrifiber board, chipboard, flakeboard, and fiberboard, e.g., medium density fiberboard (MDF), hydrophobic is a particularly preferred use.

In accordance with the present invention there is provided a lignocellulosic composite composition comprising:
   a) lignocellulosic pieces
   b) a binder
   c) a polymeric methylene diphenyl diisocyanate-polydialkylsiloxane resin as hereinbefore described and optionally
   d) a wax.

In another embodiment of the present invention there is provided a method of preparing a lignocellulosic composite product comprising:
   (a) lignocellulosic pieces
   (b) a binder
   (c) a polymeric methylene diphenyl diisocyanate-polydialkylsiloxane resin obtainable as hereinbefore described and optionally
   (d) a wax
comprising the steps of introducing the binder (b) and component (c) into a container of lignocellulosic pieces (a), optionally adding a suitable cross-linking agent, forming a partially adhered mass therefrom and hot pressing said mass into a lignocellulosic composite product.

In another embodiment of the present invention there is provided a lignocellulosic composite product obtainable from a composition comprising:
   (a) lignocellulosic pieces
   (b) a binder
   (c) a polymeric methylene diphenyl diisocyanate-polydialkylsiloxane resin obtainable as hereinbefore described; and optionally.
   (d) a wax
comprising the steps of introducing the binder (b), and components (c) and (d) into a container of lignocellulosic pieces (a), optionally adding a suitable cross-linking agent, forming a partially adhered mass therefrom and hot pressing said mass into a lignocellulosic composite product.

The lignocellulosic pieces (a) may be in the form of chips, shavings, strands, scrim, wafers, fibres, sawdust, bagasse, straw and wood wool. Preferably the lignocellulosic pieces (a) will be present in an amount of from 70 to 99 weight (wt) % of the total lignocellulosic composite composition.

The organic binding agent (b) may be any suitable binder but is preferably selected from phenol formaldehyde (PF) resins, urea formaldehyde (UF) resins, melamine-formaldehyde resins, resorcinol-formaldehyde resins, isocyanate/urethane resins, poly(vinyl acetate) (PVA), polymeric methylene diphenyl diisocyanate (pMDI) and the like but is preferably pMDI. Preferably the organic binding agent (b) will be present in an amount of from 0.1 to 30 wt % of the total lignocellulosic composite composition. It is to be understood that when discussing the total lignocellulosic composite composition in terms of % wt, the total composition weight will always be 100%.

Waxes e.g. fully-refined paraffin waxes or semi-refined paraffin waxes i.e. slack waxes may be present at low levels e.g. up to 3% by weight of the composition, alternatively up to 1.5% by weight of the composition, alternatively up to 1% by weight of the composition, alternatively up to 0.5% by weight of the composition can be present in the composition. Alternatively the compositions as hereinbefore described are wax-free, i.e. they contain 0% wax by weight of the total lignocellulosic composite composition.

Obviously it is to be understood that the total amount by weight of the composition for all compositions in accordance with the invention shall be 100% by weight i.e. the cumulative amount of all components present in a composition shall add up to 100% by weight.

Optionally as discussed above a cross-linking agent may be introduced into the composite. Any suitable cross-linking agent material i.e. a cross-linking catalyst may be used but bis(2-dimethylaminoethyl)ether (BDMAEE) is particularly preferred. Alternatives include N,N,N',N',N"-pentamethyldiethylenetriamine (PMDTA), triethylenediamines and other blowing catalysts. In the case of BDMAEE the cross-linking catalyst may be added in an aqueous solution.

The invention in accordance with the present invention will now be depicted in the following Examples in which all viscosities were measured at 25° C. unless otherwise indicated:

EXAMPLE 1

Synthesis of the Select pMDI-PDMS Hybrid Resin (Containing 22.2 wt % Polydimethylsiloxane (PDMS)

A 1 L flask was loaded with 80.0 g pMDI and 80.0 g toluene, and heated to 70° C. To the flask was quickly added—a solution of 22.8 g 3-hydroxypropyl dimethyl terminated polydimethylsiloxane of the formula

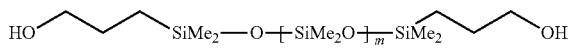

where m is equal to 12, pre-dissolved in 22.8 g toluene under agitation. After 30 minutes at 70° C., the reaction mixture was vacuum stripped to remove toluene. The 99.6 g hybrid resin containing 22.2 wt % PDMS was recovered as an almost clear brownish liquid in 96.9% yield. The liquid has a number average molecular weight of 2050, a polydispersity of 1.5 and a viscosity of 1000 cSt. The structure of the product was confirmed with $^1$H NMR.

The viscosity was measured with calibrated Cannon viscometers at 25° C. The number average molecular weight and polydispersity were measured with gel permeation chromatography (GPC).

EXAMPLE 2

Synthesis of Another Select pMDI-PDMS Hybrid Resin (Containing 55.5 wt % PDMS)

A 500 mL flask was loaded with 30.0 g pMDI and 30.0 g toluene, and heated to 70° C. To the flask was quickly added a solution of 37.4 g 3-(2-hydroxyethoxy)propyl dimethyl terminated polydimethylsiloxane of the formula

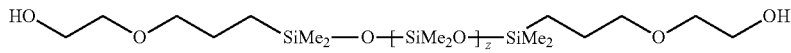

where z is equal to 18, pre-dissolved in 37.4 g toluene under agitation. After 30 minutes at 70° C., the reaction mixture was vacuum stripped to remove toluene. The 66.1 g hybrid resin containing 55.5 wt % PDMS was recovered as an almost clear brownish liquid in 98.0% yield. The structure of the product was confirmed with $^1$H NMR.

EXAMPLE 3

Preparation of OSB Boards Using the pMDI-PDMS Hybrid Resin of Example 1

A tumbler (mixer) was loaded with 300.0 g wood chips. Under tumbling (i.e. mixing), (i.e. whilst tumbling the wood chips in the tumbler) 1.7 g of the select pMDI-PDMS hybrid resin prepared in Example 1, 3.0 g of the aqueous solution containing 2.5 wt % bis(2-dimethylaminoethyl)ether (BDMAEE) and 13.3 g pMDI were sequentially sprayed onto the chips. The chips were set for 10 minutes between the $2^{nd}$ and $3^{rd}$ sprays. BDMAEE was used to promote partial crosslinking of the hybrid resin. The treated chips had approximately 0.12 wt % PDMS and 4.9 wt % pMDI loadings (based on the total lignocellulosic composite composition). Then the treated chips were hotpressed into two OSB boards of equal weight at 150° C. under 500 psi (3447000 Pa) pressure for 10 minutes. The resultant boards were believed to have approximately 0.12 wt % PDMS.

EXAMPLE 4

Testing of Water Repellency and Dimensional Stability of Finished OSB Boards

The finished OSB boards from Example 3 were trimmed down to 5"×5" size and conditioned for 2 days. The trimmed boards were immersed under 1" water for 24 hours. Thickness swelling and water absorption were measured at 2 hr and 24 hr in accordance with Method 23 in ASTM standard 1037 "Standard Test Methods for Evaluating Properties of Wood-Base Fibre and Particle Panel Materials". Dimensional stability was determined from thickness swelling. A large thickness swelling measured with Method 23 in ASTM standard 1037 means a low dimensional stability, or a small thickness swelling means a high dimensional stability. A high dimensional stability (or a small thickness swelling) is desired for OSB boards.

When the select hybrid resin containing 22.2 wt % PDMS was used to treat wood chips, the finished OSB having 0.12 wt % PDMS had better water repellency and dimensional stability than the other OSB having lower or higher PDMS loadings (Tables 1 and 2). Water repellency can be estimated from 2 Hr water uptake and 24 Hr water uptake. Dimensional stability can be estimated from 24 Hr ETS and 24 Hr Edge+1" Swelling. The average 2 Hr ETS and 24 Hr ETS are 13% and 16% respectively for the select hybrid resin. Compared to the average 2 Hr ETS and 24 Hr ETS, 8% and 17% respectively, for the benchmark wax-treated OSB, the select hybrid resin gives better 24 Hr ETS than wax.

TABLE 1

Water testing results for OSB boards with 0.12, 0.25 and 1.1 wt % PDMS loading (of the total lignocellulosic composite composition) delivered with the select pMDI-PDMS hybrid resin, showing the lowest swelling and absorption at 0.12 wt % PDMS loading of the total lignocellulosic composite composition.

| | Silicone Amount Present (wt %) of the total lignocellulosic composite composition | | |
|---|---|---|---|
| | 0.12 | 0.25 | 1.1 |
| 2 Hr ETS (%) | 11 | 11 | 14 |
| 2 Hr Edge + 1" Swelling (%) | 6 | 6 | 10 |
| 24 Hr ETS (%) | 14 | 16 | 20 |
| 24 Hr Edge + 1" Swelling (%) | 13 | 14 | 21 |
| 2 Hr water Uptake (%) | 14 | 14 | 23 |
| 24 Hr Water Uptake (%) | 38 | 39 | 58 |

TABLE 2

Water testing results for OSB boards with 0.12, 0.06 and 0 wt % PDMS loading delivered with the select pMDI-PDMS hybrid resin, showing the lowest swelling and absorption at 0.12 wt % PDMS loading

| | Silicone Amount Present (wt %) of the total lignocellulosic composite composition | | |
|---|---|---|---|
| | 0.12 | 0.06 | 0.0 |
| 2 Hr ETS (%) | 13 | 16 | 21 |
| 2 Hr Edge + 1" Swelling (%) | 7 | 10 | 18 |
| 24 Hr ETS (%) | 17 | 21 | 22 |
| 24 Hr Edge + 1" Swelling (%) | 17 | 21 | 21 |
| 2 Hr water Uptake (%) | 23 | 27 | 75 |
| 24 Hr Water Uptake (%) | 63 | 76 | 95 |

The invention claimed is:

1. A method of preparing a polymeric methylene diphenyl diisocyanate-polydialkylsiloxane resin comprising isocyanate functionality by mixing at a temperature between 25° C. and 100° C.:
   (i) polymeric methylene diphenyl diisocyanate with
   (ii) a 3-(2-hydroxyethoxy) propyl dimethyl terminated polydimethylsiloxane having a general formula of:

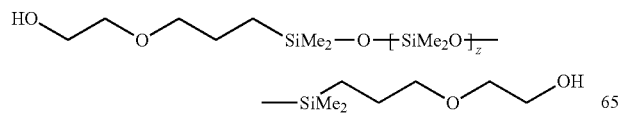

where z is a value of between 0 and 500, the polydimethylsiloxane having a viscosity of from 5 to 500 000 cSt at 25° C., optionally in the presence of a solvent; and subsequently extracting the solvent, if present; and wherein component (i) is present in an amount of from 40 to 80% of the total weight of (i) and (ii); and wherein the step of mixing is defined as:
   (a) mixing the component (i) with the solvent to form a mixture of the component (i) and the solvent, and heating the mixture of the component (i) and the solvent to a temperature of between 50 and 100° C.,
   (b) mixing the component (ii) with the solvent to form a mixture of the component (ii) and the solvent, where z is a value of between 0 and 500, the polydimethylsiloxane having a viscosity of from 5 to 500 000 cSt at 25° C., in the presence of toluene; and subsequently extracting the solvent, if present; and wherein component (i) is present in an amount of from 40 to 80% of the total weight of (i) and (ii).

2. A method in accordance with claim 1 wherein component (i) is present in an amount of from 50 to 80% of the total weight of (i) and (ii).

3. A method in accordance with claim 1 wherein the value of z is between 5 and 25.

4. A method in accordance with claim 1 wherein the polymeric methylene diphenyl diisocyanate (i) has the general structure

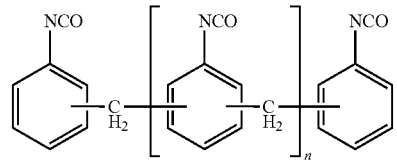

where the average value of n is from 0 to 10.

5. A method in accordance with claim 1 wherein the value of z is between 5 and 15.

6. A method in accordance with claim 5 wherein the 3-(2-hydroxyethoxy) propyl dimethyl terminated polydimethylsiloxane has a viscosity of from 5 to 10,000 cSt at 25° C.

7. A method in accordance with claim 1 wherein the 3-(2-hydroxyethoxy) propyl dimethyl terminated polydimethylsiloxane has a viscosity of from 5 to 1,500 cSt at 25° C.

8. A method of preparing a polymeric methylene diphenyl diisocyanate-polydialkylsiloxane resin comprising isocyanate functionality by mixing at a temperature between 25° C. and 100° C.:
   (i) polymeric methylene diphenyl diisocyanate with
   (ii) a 3-(2-hydroxyethoxy) propyl dimethyl terminated polydimethylsiloxane having a general formula of:

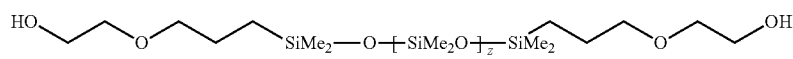

(c) mixing the mixture of the component (i) and the solvent with the mixture of the component (ii) and the solvent to form a mixture of the component (i), the component (ii), and the solvent, and (d) agitating the mixture of the component (i), the component (ii), and the solvent for a predetermined period of time.

9. A method in accordance with claim 8 wherein the solvent is present and is toluene.

10. A method in accordance with claim 8 wherein component (i) is present in an amount of from 50 to 80% of the total weight of (i) and (ii).

11. A method in accordance with claim 8 wherein the value of z is between 5 and 25.

12. A method in accordance with claim 8 wherein the polymeric methylene diphenyl diisocyanate (i) has the general structure

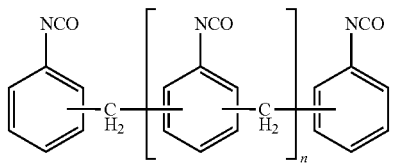

where the average value of n is from 0 to 10.

13. A method in accordance with claim 8 wherein the value of z is between 5 and 15.

14. A method in accordance with claim 13 wherein the 3-(2-hydroxyethoxy) propyl dimethyl terminated polydimethylsiloxane has a viscosity of from 5 to 10,000 cSt at 25° C.

15. A method in accordance with claim 8 wherein the 3-(2-hydroxyethoxy) propyl dimethyl terminated polydimethylsiloxane has a viscosity of from 5 to 1,500 cSt at 25° C.

* * * * *